United States Patent
Nishijima

(10) Patent No.: US 9,935,557 B2
(45) Date of Patent: Apr. 3, 2018

(54) MULTI-OUTPUT POWER SUPPLY

(71) Applicant: Fuji Electric Co., Ltd., Kanagawa (JP)

(72) Inventor: Kenichi Nishijima, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 14/989,608

(22) Filed: Jan. 6, 2016

(65) Prior Publication Data

US 2016/0218633 A1  Jul. 28, 2016

(30) Foreign Application Priority Data

Jan. 22, 2015  (JP) .................... 2015-010757

(51) Int. Cl.
*H02M 3/335* (2006.01)
*H02M 3/28* (2006.01)
*H02M 1/00* (2006.01)

(52) U.S. Cl.
CPC ........ *H02M 3/33523* (2013.01); *H02M 3/285* (2013.01); *H02M 3/33561* (2013.01); *H02M 2001/0003* (2013.01)

(58) Field of Classification Search
CPC ........... H02M 3/285; H02M 2001/003; H02M 3/33561; H02M 3/33507; H02M 3/33523; H02M 2001/007; H02M 3/335; H02M 2001/0067; H02M 2001/008; H02M 1/084
See application file for complete search history.

(56) References Cited

U.S. PATENT DOCUMENTS

| | | | | |
|---|---|---|---|---|
| 2007/0121350 A1* | 5/2007 | Duvnjak | ........... | H02M 3/33561 363/21.01 |
| 2008/0203985 A1* | 8/2008 | Dong | .................. | H02M 3/1584 323/272 |
| 2012/0287684 A1* | 11/2012 | Fahlenkamp | ..... | H02M 3/33553 363/49 |
| 2013/0249427 A1* | 9/2013 | Jin | ..................... | H05B 33/0815 315/205 |
| 2015/0236603 A1* | 8/2015 | Jimichi | ................. | H02M 5/293 363/37 |
| 2015/0357843 A1* | 12/2015 | Kobayashi | ............ | H02J 7/0016 320/118 |

FOREIGN PATENT DOCUMENTS

JP  H8-78964 A  3/1996

* cited by examiner

*Primary Examiner* — Gustavo Rosario Benitez
(74) *Attorney, Agent, or Firm* — Chen Yoshimura LLP

(57) ABSTRACT

A multi-output power supply includes: a switching element that turns ON and OFF currents flowing through all primary coils of a plurality of transformers connected in parallel at a same time; a plurality of output circuits that rectify and smooth voltages induced in secondary coils of the plurality of transformers to produce a plurality of output voltages; a plurality of feedback voltage detection circuits that detect feedback voltages corresponding to the output voltages of the plurality of the output circuits; an averaging circuit that calculates an average feedback voltage from the feedback voltages detected by the feedback voltage detection circuits; and a control circuit that uses feedback control to turn the switching element ON and OFF according to the average feedback voltage calculated by the averaging circuit.

6 Claims, 5 Drawing Sheets

MULTI-OUTPUT POWER SUPPLY

BACKGROUND OF THE INVENTION

Technical Field

The present invention relates to a multi-output power supply equipped with a switching element that turns ON and OFF the currents flowing through primary coils of a plurality of transformers connected in parallel at the same time and in which multiple output voltages are obtained from the voltages induced in secondary coils of the transformers.

Background Art

Flyback-type switching power supplies have attracted attention as power supplies for driving low capacity electrical power loads in the several dozen watt class and below. More recently, there has been increased demand for a reduced total number of component parts in the configuration as well as a more simplified and cheaper configuration in such switching power supplies. Furthermore, multi-output power supplies that can provide multiple output voltages on the order of 15V and load currents of approximately 50 mA or less, for example, have attracted attention as switching power supplies for three-phase inverters for use in powering vehicle motors.

FIGS. 4A to 4C schematically illustrate example configurations for this type of multi-output power supply. T1 and T2 are transformers connected in parallel, and Q1 and Q2 are switching elements such as power MOSFETs or IGBT devices that turn ON and OFF the currents flowing through primary coils P1 and P2 of the transformers T1 and T2. As the currents flowing through the primary coils P1 and P2 of the transformers T1 and T2 are turned ON and OFF, voltages are induced in secondary coils S1 and S2 of the transformers T1 and T2. These voltages are passed through rectifying and smoothing circuits made using diodes D1 and D2 and capacitors C1 and C2 to produce output voltages Vout1 and Vout2, which are output in parallel to a plurality of loads (not illustrated in the figure).

In FIGS. 4A to 4C, IC1 and IC2 are control circuits that turn the switching elements Q1 and Q2 ON and OFF. Moreover, FB1 and FB2 are feedback voltage detection circuits that detect feedback voltages Vfb1 and Vfb2 induced in auxiliary coils A1 and A2 of the transformers T1 and T2. These feedback voltage detection circuits FB1 and FB2 include diodes that rectify the voltages induced in the auxiliary coils A1 and A2 of the transformers T1 and T2 and capacitors that smooth the voltages rectified by the diodes. The feedback voltage detection circuits FB1 and FB2 also include voltage-dividing resistors Ra and Rb that divide the voltages smoothed by the capacitors to produce feedback voltages to apply to the control circuits IC1 and IC2.

The multi-output power supply illustrated in FIG. 4A includes the two switching elements Q1 and Q2 connected in series to the primary coils P1 and P2 of the two parallel transformers T1 and T2. These switching elements Q1 and Q2 are turned ON and OFF by the two control circuits IC1 and IC2. Therefore, the multi-output power supply also includes the feedback voltage detection circuits FB1 and FB2 corresponding to the control circuits IC1 and IC2.

In contrast, the multi-output power supply illustrated in FIG. 4B includes only a single control circuit IC1 that is powered by the feedback voltage Vfb1 and that turns both of the switching elements Q1 and Q2 ON and OFF at the same time. Configuring the multi-output power supply in this way makes it possible to remove the control circuit IC2 and the feedback voltage detection circuit FB2 from the multi-output power supply illustrated in FIG. 4A, thereby making it possible to reduce the total number of component parts.

Furthermore, the multi-output power supply illustrated in FIG. 4C includes only a single switching element Q1 that is used to turn ON and OFF the currents flowing through both of the primary coils P1 and P2 of the transformers T1 and T2 at the same time. Configuring the multi-output power supply in this way makes it possible to remove the switching element Q2 from the multi-output power supply illustrated in FIG. 4B, thereby making it possible to significantly reduce the total number of component parts. In other words, configuring the multi-output power supply as illustrated in FIG. 4C makes it possible to turn ON and OFF the currents flowing through both of the primary coils P1 and P2 of the two transformers T1 and T2 at the same time using only the one control circuit IC1 and the one switching element Q1. Therefore, this configuration makes it possible to significantly reduce the total number of component parts, thereby also reducing production costs.

Here, the output voltage (feedback voltage) Vout (=Vfb1) of the feedback voltage detection circuit FB1 that detects, from the voltage induced in the auxiliary coil A1, the feedback voltage Vfb1 applied to the control circuit IC1 is given by:

$$Vout=Vref\times(1+Ra/Rb)\times(Nsec/Naux)-\Delta V$$

Here, Vref is a reference voltage in an error amplifier, Ra/Rb is the ratio of the resistance values of the voltage-dividing resistors, and Nsec/Naux is the ratio between the number of coils in the secondary coil S1 and the auxiliary coil A1 of the transformer T1. Furthermore, $\Delta V$ is the voltage drop caused by the components of the feedback voltage detection circuit FB1 such as the diode.

In a multi-output power supply configured as described above, the ability to regulate the multiple output voltages is strongly affected by the loads connected to the outputs. One of the output voltages may fluctuate due to changes within a prescribed range of the load connected to one of the other outputs. This phenomenon is known as cross-regulation. Cross-regulation is thought to be primarily an effect related to the degree of coupling between the coils of the transformers T1 and T2 or factors such as surge voltages in the snubber circuits. Patent Document 1 discloses one example of a technology for reducing this type of cross-regulation, in which the resistance values of the voltage-dividing resistors Ra and Rb used to detect the feedback voltage Vfb are adjusted to compensate the reference voltage of the multi-output power supply.

RELATED ART DOCUMENT

Patent Document

Patent Document 1: Japanese Patent Application Laid-Open Publication No. H8-78964

SUMMARY OF THE INVENTION

However, as illustrated in FIG. 5 by the changes in each output voltage in a three output multi-output power supply with an output voltage Vout of 15.5V±1.5V, if the load at one of the outputs (CH3, for example) becomes greater or smaller, the output voltage Vout at that output changes drastically. Solving this type of problem is currently left entirely as a matter of trial and error during power supply design.

The output voltages shown in FIG. 5 are actual measurements taken on the three channels CH1 to CH3 of an example multi-output power supply designed using this type of trial and error approach. This example was designed to have an allowable range ΔVout in the output voltage Vout at each of the outputs CH1 to CH3 of less than or equal to 3V (=±1.5V). However, the output CH3 exhibits changes in output voltage as large as 4V due to the effects of cross-regulation caused by changes in loading.

The present invention was made in view of these problems and aims to provide a multi-output power supply that has a simple configuration and in which changes in output voltage at each output can be kept within a prescribed allowable range by reducing the severity of cross-regulation effects on each output.

More particularly, in at least one aspect, the present invention aims to provide a multi-output power supply in which the total number of component parts is reduced by using a single switching element to turn ON and OFF the currents flowing through the primary coils of a plurality of transformers at the same time and that also makes it possible to reduce the effects of cross-regulation as well as to simplify the power supply design process. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multi-output power supply, including: a switching element that turns ON and OFF currents flowing through all primary coils of a plurality of transformers connected in parallel at a same time; a plurality of output circuits that rectify and smooth voltages induced in secondary coils of the plurality of transformers to produce a plurality of output voltages; a plurality of feedback voltage detection circuits that detect feedback voltages corresponding to the output voltages of the plurality of the output circuits; an averaging circuit that calculates an average feedback voltage from the feedback voltages detected by the feedback voltage detection circuits; and a control circuit that uses feedback control to turn the switching element ON and OFF according to the average feedback voltage calculated by the averaging circuit.

In one aspect, the feedback voltage detection circuits rectify and smooth voltages induced in auxiliary coils of the plurality of transformers to produce, using these detected voltages, the feedback voltages that are then applied to the averaging circuit. In another aspect, one of the feedback voltage detection circuits rectifies and smoothes a voltage induced in the auxiliary coil of one of the transformers to produce, using this detected voltage, a drive voltage for the control circuit.

In one aspect, the feedback voltage detection circuits detect the feedback voltages as differences in the output voltages of the output circuits relative to a preset output reference voltage, and the feedback voltages are transmitted back to primary coils of the transformers using photocouplers and then applied to the averaging circuit.

In one aspect, the control circuit compares the average feedback voltage to a prescribed internal reference voltage to generate a PWM signal for turning the switching element ON and OFF. In another aspect, the control circuit includes a plurality of feedback signal input terminals and the averaging circuit is integrated into the control circuit, and the averaging circuit calculates an average value of feedback voltages input to the feedback signal input terminals to obtain the average feedback voltage.

In one aspect, the averaging circuit calculates the average feedback voltage as an output voltage Vo, which is equal to a sum of N of feedback signals Vin1 to VinN (where N is an integer greater than or equal to 2) divided by N, as given by:

$$Vo = (1/N)\Sigma VinN.$$

In the multi-output power supply configured as described above, the average value of the feedback voltages corresponding to the output voltages at each output simply needs to be calculated and applied as a feedback signal to the control circuit that then turns the switching element ON and OFF using feedback control. This configuration is simple and makes it possible to reduce the severity of the effects of cross-regulation between the outputs.

More particularly, this results in a simple configuration with a reduced number of component parts for the overall multi-output power supply while also making it possible to significantly reduce the severity of the effects of cross-regulation between the outputs. This, in turn, drastically reduces the amount of trial and error involved in designing the multi-output power supply and makes it possible to achieve a variety of advantageous effects such as simplification of the power supply design process.

It is to be understood that both the foregoing general description and the following detailed description are exemplary and explanatory, and are intended to provide further explanation of the invention as claimed.

DETAILED DESCRIPTION OF EMBODIMENTS

A multi-output power supply according to one embodiment of the present invention will be described below.

Figure 1:
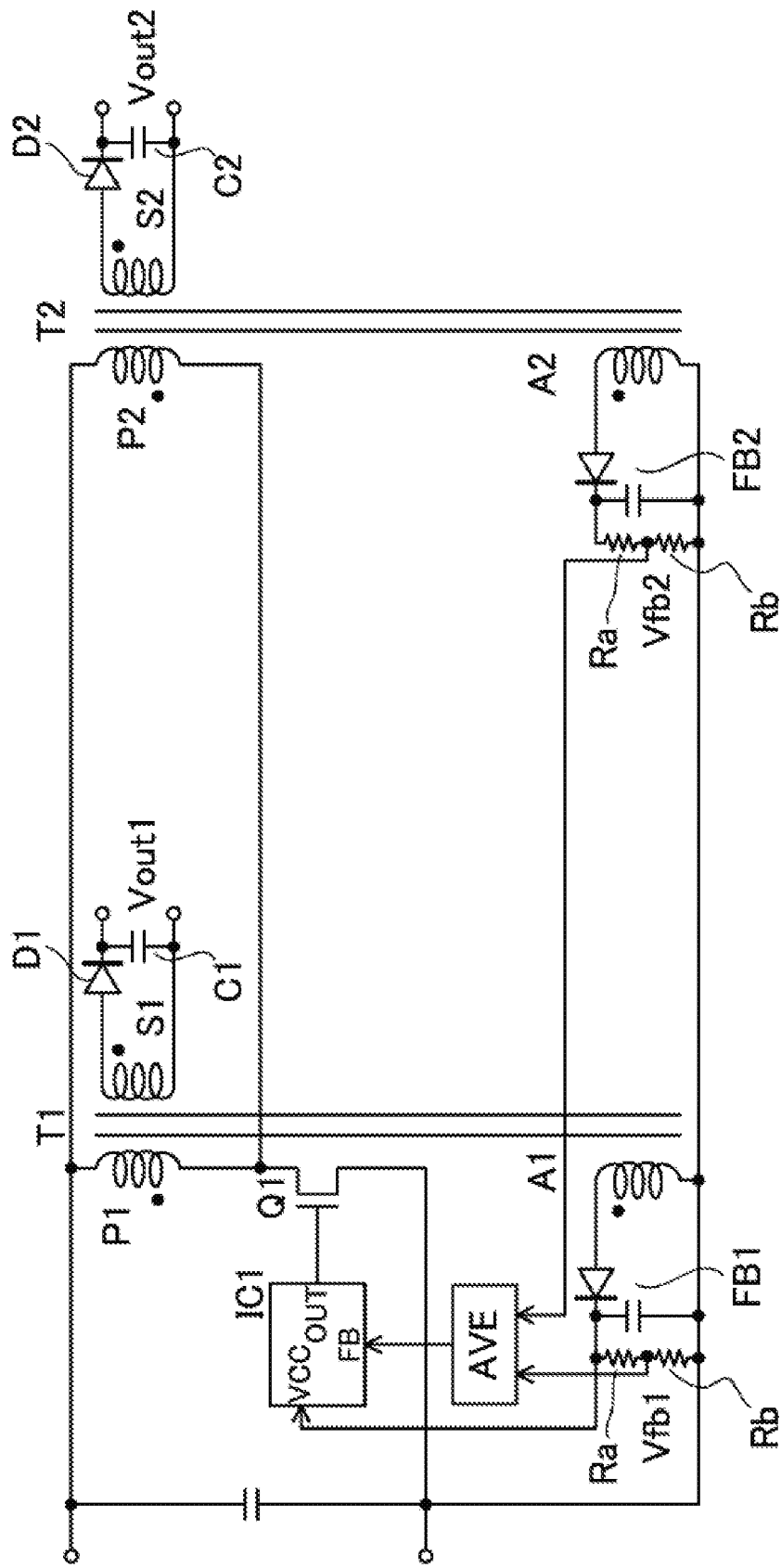
FIG. 1 schematically illustrates a configuration of the main components of a multi-output power supply according to an embodiment of the present invention.
Figure 4A:
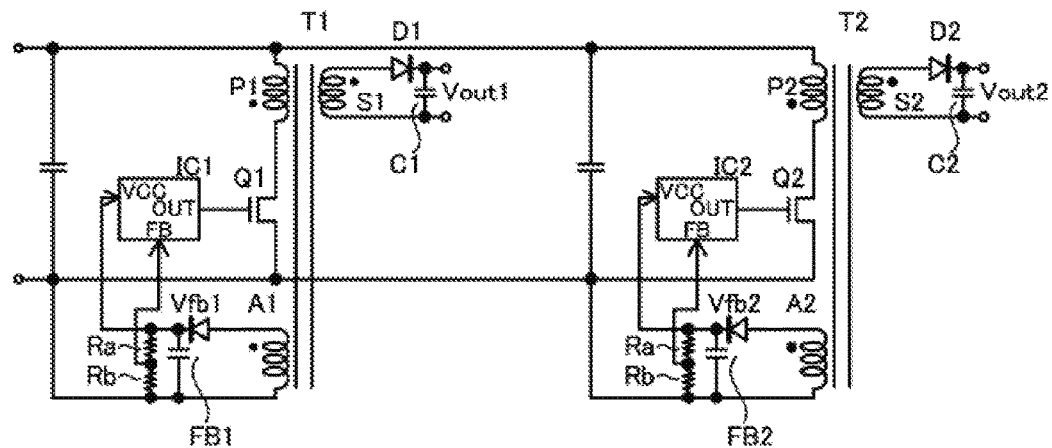
FIGS. 4A to 4C illustrate representative examples of configurations of conventional multi-output power supplies.
Figure 4B:
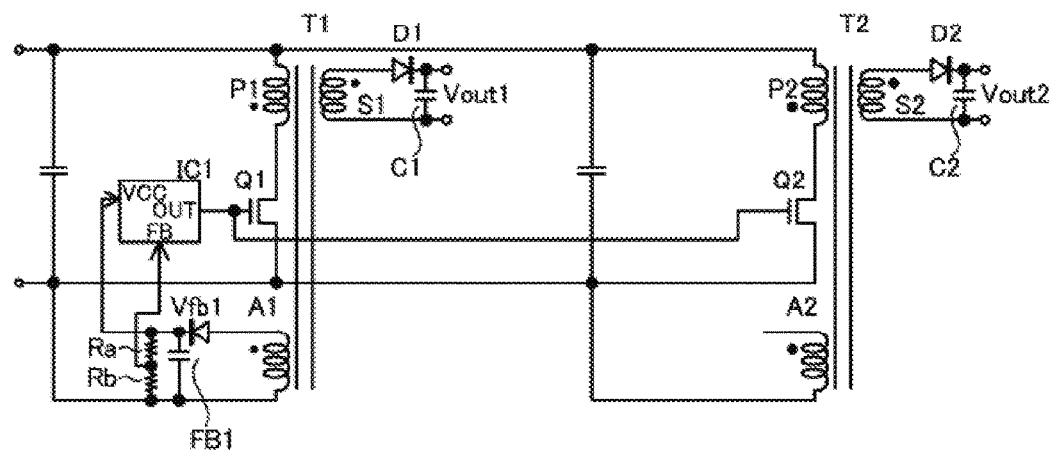
Figure 4C:
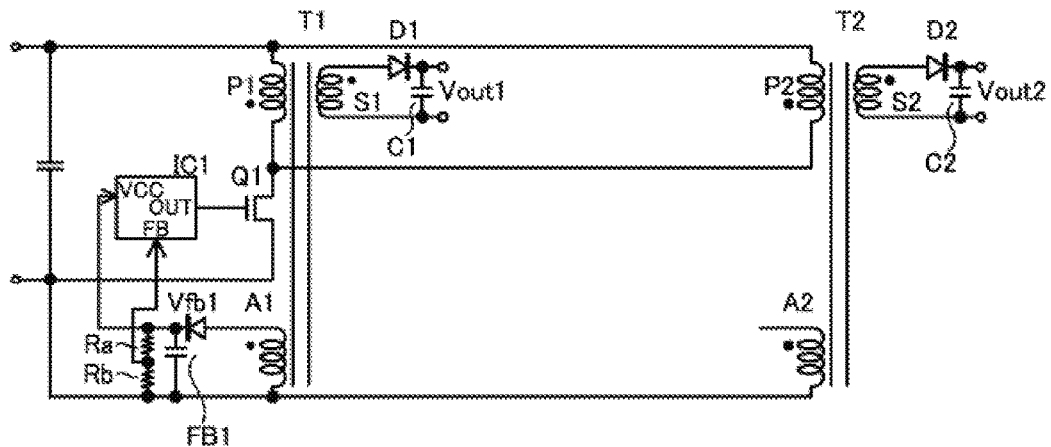
Figure 5:
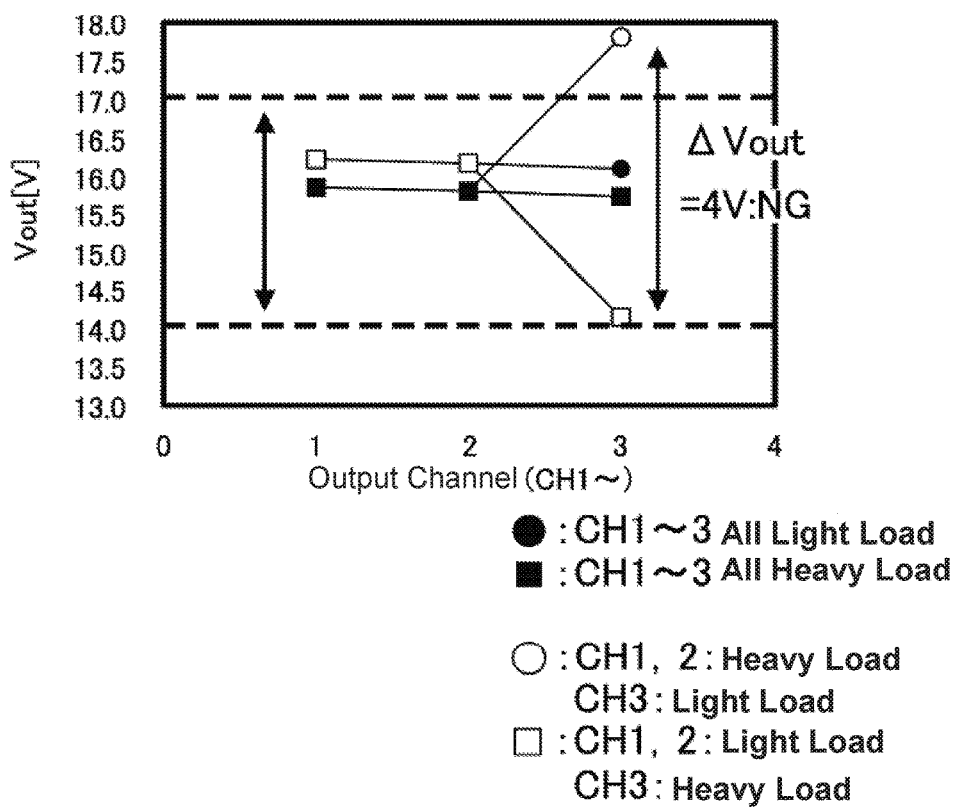
FIG. 5 illustrates an actual measurement example of the cross-regulation effect in a conventional multi-output power supply.

FIG. 1 schematically illustrates a configuration of the main components of the multi-output power supply according to the embodiment of the present invention. This multi-output power supply has multiple outputs and is configured substantially the same as the multi-output power supply illustrated in FIG. 4C. This particular multi-output power supply has two outputs; however, the present invention can also be applied to multi-output power supplies with N outputs (where N is an integer greater than or equal to 2).

The multi-output power supply according to the present embodiment includes two transformers T1 and T2 connected in parallel and a single switching element Q1 that turns ON and OFF the currents flowing through primary coils P1 and P2 of the transformers T1 and T2 at the same time. The multi-output power supply also includes a control circuit IC1 that turns the switching element Q1 ON and OFF using feedback control.

The characteristic feature of this multi-output power supply is the inclusion of two feedback voltage detection circuits FB1 and FB2 that detect feedback voltages Vfb1 and Vfb2 corresponding to output voltages Vout1 and Vout2 of the two outputs. The multi-output power supply also includes an averaging circuit AVE that calculates the average value Vfb_ave of the two feedback voltages Vfb1 and Vfb2 and feeds that value back into the control circuit IC1.

The feedback voltage detection circuits FB1 and FB2 rectify and smooth voltages induced in auxiliary coils A1 and A2 of the transformers T1 and T2 and then divide these detected voltages using voltage-dividing resistors Ra and Rb that have a prescribed resistance value ratio in order to obtain the feedback voltages Vfb1 and Vfb2, for example. Moreover, in this embodiment, the voltage induced in the auxiliary coil A1 of the transformer T1 and then rectified and smoothed by the feedback voltage detection circuit FB1 is supplied as a drive voltage VCC to the control circuit IC1.

The averaging circuit AVE calculates the average feedback voltage Vfb_ave as an output voltage Vo, which is the sum of the feedback voltages Vin1 to VinN corresponding to the N outputs (where N is an integer greater than or equal to 2) divided by the number of outputs N:

$$Vo=(1/N)\Sigma VinN$$

More specifically, for a multi-output power supply with two outputs, the averaging circuit AVE calculates the average feedback voltage Vfb_ave as:

$$Vfb\_ave=Vo=(Vin1+Vin2)/2$$

Figure 2:
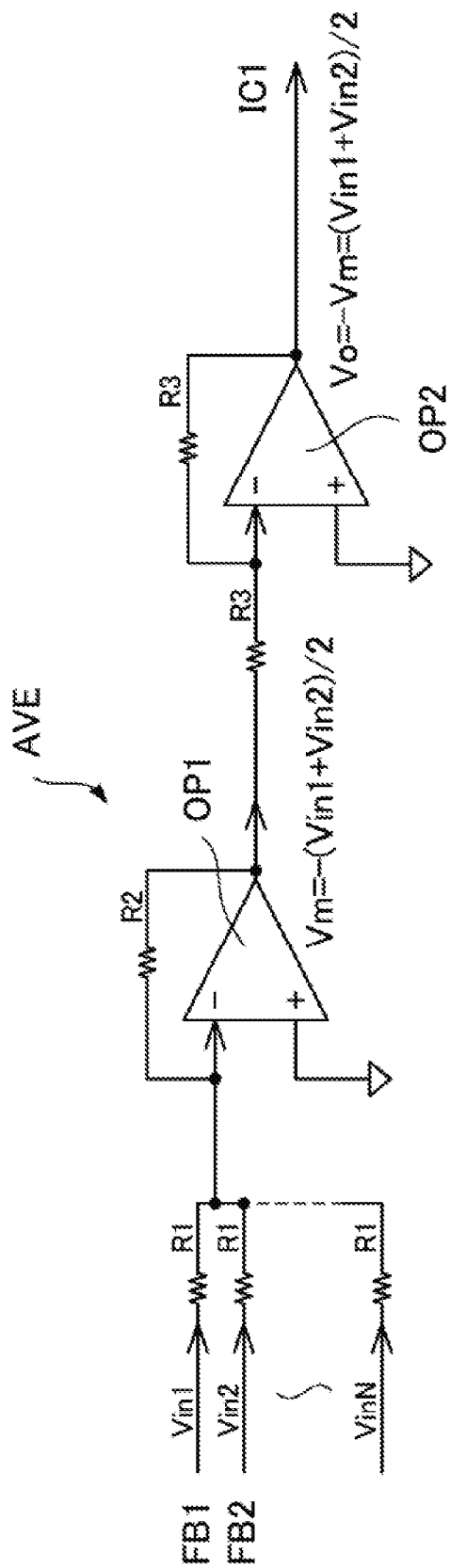
FIG. 2 illustrates an example of a configuration of an averaging circuit for the multi-output power supply illustrated in FIG. 1.

As illustrated in FIG. 2, in order to implement this averaging process, the averaging circuit AVE includes two op-amp circuits OP1 and OP2, for example. In the first op-amp circuit OP1, the non-inverting input is grounded, N input resistors with a resistance of R1 are connected in parallel to the inverting input, and a feedback resistor with a resistance of R2 is connected between the inverting input and the output to create an adding circuit. More particularly, the op-amp circuit OP1 outputs an output voltage Vm, which is equal to the sum of the input voltages at the output terminal divided by N, where N is the resistance ratio R1/R2 between the input resistors and the feedback resistor:

$$Vm=-(1/N)\Sigma VinN$$

In the second op-amp circuit OP2, the non-inverting input is grounded, an input resistor with a resistance of R3 is connected to the inverting input, and a feedback resistor with a resistance of R3 is connected between the inverting input and the output. This op-amp circuit OP2 functions as an inverting buffer that inverts the output voltage Vm from the op-amp circuit OP1 and outputs an output voltage Vo, which is used as the average feedback voltage Vfb_ave and is given by:

$$Vo=-Vm=(1/N)\Sigma VinN$$

In this way, the multi-output power supply includes the averaging circuit AVE to average the feedback voltages Vin1 to VinN corresponding to the output voltages at each of the outputs of the multi-output power supply and produce an average feedback voltage Vfb_ave, which is then fed back into the control circuit IC1. The control circuit IC1 uses this average feedback voltage Vfb_ave to generate a PWM signal for turning the switching element Q1 ON and OFF using feedback control as described above.

Therefore, configuring the multi-output power supply as described above makes it possible to turn the switching element Q1 ON and OFF using feedback control not only when the loads at each output are constant but also when the load at one of the outputs exhibits significant fluctuations by using the average feedback voltage Vfb_ave, which changes according to those load fluctuations. In other words, changes in the output voltage Vout at one of the outputs due to load fluctuations are not ignored but are reflected as changes in the average feedback voltage Vfb_ave, which is then fed back into the control circuit IC1. This makes it possible to reduce cross-regulation due to load fluctuations at one of the outputs. This also makes it possible to keep the changes in the output voltages Vout at each of the outputs within the appropriate design range.

Figure 3:
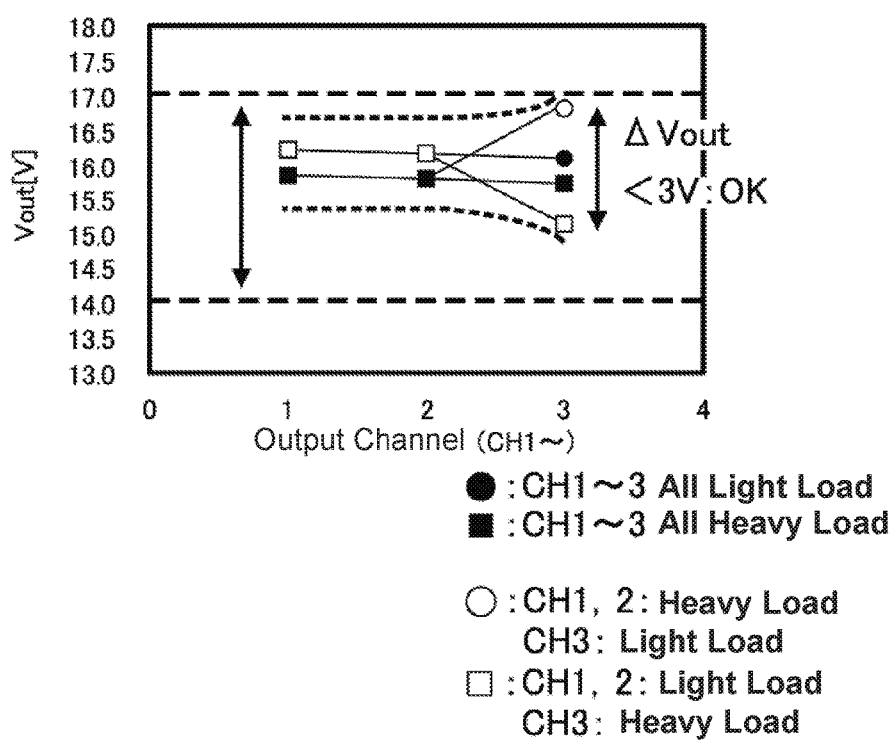
FIG. 3 illustrates the predicted cross-regulation in the multi-output power supply illustrated in FIG. 1.

FIG. 3 illustrates the predicted changes (that is, cross-regulation) in the output voltages Vout at each of the outputs of a multi-output power supply according to one aspect of the present invention configured as described above and designed to have three outputs each with an output voltage Vout of 15.5V±1.5V. As illustrated in FIG. 3, if the load at one of the outputs (CH3, for example) becomes greater or smaller, the change in output voltage Vout due to that load fluctuation is reflected in the average feedback voltage Vfb_ave and fed back into the control circuit IC1, thereby making it possible to reduce the magnitude of the change in the output voltage Vout at that output. This also makes it possible to keep the changes in the output voltages Vout at each of the outputs CH1 to CH3 within a prescribed allowable range ΔVout such as 3V (=±1.5V).

The multi-output power supply of the present invention, in at least one aspect, makes it possible to reduce cross-regulation between the outputs, thereby making it possible to easily satisfy design requirements for the output voltage at each output. This removes the need to design the power supply using the trial and error approach employed in conventional technologies, thereby making it possible to simplify and shorten the power supply design process. As described above, the multi-output power supply in at least one aspect of the present invention also makes it possible to reduce the number of component parts while maintaining the required power supply performance, thereby making it possible to reduce production costs.

It should be noted that the present invention is not limited to the embodiment described above. For example, the averaging circuit AVE may be integrated into the control circuit IC1. In this case, however, the control circuit IC1 must have additional inputs for the feedback signals from each of the outputs of the multi-output power supply. Moreover, the example of the multi-output power supply described above has two outputs; however, the present invention can also be applied to multi-output power supplies with N outputs (where N is an integer greater than or equal to 2).

Furthermore, in the embodiment described above, the feedback voltages Vin1 and Vin2 are detected from the voltages induced in the auxiliary coils A1 and A2 of the transformers T1 and T2. However, the feedback voltages Vin1 and Vin2 may also be detected from the output voltages Vout1 and Vout2 of the secondary coils S1 and S2 of the transformers T1 and T2 and transmitted back to the primary coil P1 side of the transformer T1 using a photocoupler PC. In addition, various other modifications may be made without departing from the spirit of the present invention.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multi-output power supply, comprising: a plurality of transformers connected in parallel at a same time; each of the transformers having a primary coil and a secondary coil; a switching element connected to each of the primary coils of the plurality of transformers, so as to turn ON and OFF respective currents flowing through all of the primary coils of the plurality of transformers connected in parallel; a plurality of output circuits that rectify and smooth voltages induced in the respective secondary coils of the plurality of transformers to produce a plurality of output voltages, respectively; a plurality of feedback voltage detection circuits that respectively detect feedback voltages corresponding to the output voltages of the plurality of the output circuits; an averaging circuit that calculates an average feedback voltage from the feedback voltages simultaneously detected by the feedback voltage detection circuits; and a control circuit that uses feedback control to turn the switching element ON and OFF according to the average feedback voltage calculated by the averaging circuit; wherein the averaging circuit calculates the average feedback voltage as an output voltage Vo, which is equal to a sum of N of feedback signals Vin1 to VinN, where N is an integer greater than or equal to 2, divided by N, as given by: $Vo=(1/N)\Sigma VinN$.

2. The multi-output power supply according to claim 1, wherein each of the plurality of transformer has an auxiliary coil on a primary side, and the feedback voltage detection circuits rectify and smooth voltages induced in the respective auxiliary coils of the plurality of transformers to produce, using these detected voltages, the feedback voltages that are then applied to the averaging circuit.

3. The multi-output power supply according to claim 2, wherein one of the feedback voltage detection circuits rectifies and smoothes a voltage induced in the auxiliary coil of one of the transformers to produce, using this detected voltage, a drive voltage for the control circuit.

4. The multi-output power supply according to claim 1, wherein the feedback voltage detection circuits detect the feedback voltages as the output voltages of the output circuits, and the feedback voltages are transmitted to the averaging circuit using photocouplers.

5. The multi-output power supply according to claim 1, wherein the control circuit compares the average feedback voltage to a prescribed internal reference voltage to generate a PWM signal for turning the switching element ON and OFF.

6. The multi-output power supply according to claim 1, wherein the control circuit includes a plurality of feedback signal input terminals and the averaging circuit is integrated into the control circuit, and wherein the averaging circuit calculates an average value of feedback voltages input to the feedback signal input terminals to obtain the average feedback voltage.

* * * * *